United States Patent
Kascenas et al.

(10) Patent No.: US 12,475,688 B2
(45) Date of Patent: Nov. 18, 2025

(54) DATA PROCESSING APPARATUS FOR TRAINING A MODEL WITH ABNORMAL MEDICAL IMAGE DATA TO IDENTIFY ABNORMAL MEDICAL IMAGE DATA

(71) Applicant: CANON MEDICAL SYSTEMS CORPORATION, Otawara (JP)

(72) Inventors: Antanas Kascenas, Edinburgh (GB); Alison O'Neil, Edinburgh (GB)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 505 days.

(21) Appl. No.: 17/880,725

(22) Filed: Aug. 4, 2022

(65) Prior Publication Data

US 2023/0103692 A1    Apr. 6, 2023

Related U.S. Application Data

(60) Provisional application No. 63/252,757, filed on Oct. 6, 2021.

(51) Int. Cl.
| | |
|---|---|
| *G06V 10/774* | (2022.01) |
| *G06T 3/40* | (2006.01) |
| *G06T 7/00* | (2017.01) |
| *G06V 10/75* | (2022.01) |
| *G06V 10/82* | (2022.01) |
| *G06V 10/776* | (2022.01) |

(52) U.S. Cl.
CPC .............. *G06V 10/774* (2022.01); *G06T 3/40* (2013.01); *G06T 7/0012* (2013.01); *G06V 10/759* (2022.01); *G06V 10/82* (2022.01); *G06T 2207/10088* (2013.01); *G06T 2207/20081* (2013.01); *G06T 2207/20084* (2013.01); *G06T 2207/20212* (2013.01); *G06T 2207/30016* (2013.01); *G06T 2207/30096* (2013.01); *G06V 10/776* (2022.01); *G06V 2201/03* (2022.01)

(58) Field of Classification Search
None
See application file for complete search history.

(56) References Cited

U.S. PATENT DOCUMENTS

2021/0313045 A1*  10/2021  Wu ................... G06V 10/764

OTHER PUBLICATIONS

"Benefits of Linear Conditioning with Metadata for Image Segmentation" Lemay et al. Apr. 2021 (Year: 2021).*
Tan et al., "Detecting Outliers with Foreign Patch Interpolation", Journal of Machine Learning for Biomedical Imaging, Apr. 2022, pp. 1-27.

(Continued)

*Primary Examiner* — Lennin R Rodriguezgonzalez
(74) *Attorney, Agent, or Firm* — Oblon, McClelland, Maier & Neustadt, L.L.P.

(57) ABSTRACT

An apparatus for training a model to identify abnormal medical/image data comprises processing circuitry configured to:
 receive medical/image data;
 obtain a local region and a context region from the medical/image data;
 generate abnormal medical/image data using the local region and/or the context region;
 train a model using the medical/image data and the generated abnormal medical/image data to identify abnormal medical/image data.

18 Claims, 7 Drawing Sheets

(56) References Cited

OTHER PUBLICATIONS

Chen et al., "Unsupervised Lesion Detection via Image Restoration with a Normative Prior", Medical Image Analysis, vol. 64, Aug. 2020, 16 pages.

Marimont et al., "Anomaly Detection Through Latent Space Restoration Using Vectorquantized Variational Autoencoders", arXiv preprint arXiv:2012.06765v1 [cs.CV], 2020, 4 pages.

Schlegl et al., "f-AnoGAN: Fast unsupervised anomaly detection with generative adversarial networks", Medical Image Analysis, vol. 54, 2019, pp. 30-44.

Baur et al., "SteGANomaly: Inhibiting CycleGAN Steganography for Unsupervised Anomaly Detection in Brain MRI", International Conference on Medical Image Computing and Computer-Assisted Intervention, Springer, 2020, pp. 718-727.

Han et al., "MADGAN: unsupervised Medical Anomaly Detection GAN using multiple adjacent brain MRI slice reconstruction", arXiv preprint arXiv:2007.13559, 2020, pp. 1-23.

Alex et al., "Generative adversarial networks for brain lesion detection", Proceedings of SPIE 10133, Medical Imaging 2017: Image Processing, International Society for Optics and Photonics, vol. 10133, Feb. 2017, 10 pages.

Atlason et al., "Unsupervised brain lesion segmentation from MRI using a convolutional autoencoder", Medical Imaging 2019: Image Processing, International Society for Optics and Photonics, vol. 10949, 2019, 7 pages.

Baur et al., "Deep Autoencoding Models for Unsupervised Anomaly Segmentation in Brain MR Images", International MICCAI Brainlesion Workshop, Springer, 2018, pp. 1-9.

Alex et al., "Semi-supervised Learning using Denoising Autoencoders for Brain Lesion Detection and Segmentation", Journal of Medical Imaging, vol. 4, No. 4, 2017, 12 pages.

Zimmerer et al., "Unsupervised Anomaly Localization using Variational Auto-Encoders", International Conference on Medical Image Computing and Computer-Assisted Intervention, Springer, 2019, 15 pages.

Zimmerer et al., "Context-encoding Variational Autoencoder for Unsupervised Anomaly Detection", arXiv preprint arXiv:1812.05941, 2018, pp. 1-13.

Chen et al., "Unsupervised Detection of Lesions in Brain MRI using constrained adversarial auto-encoders", arXiv preprint arXiv:1806.04972, 2018, pp. 1-9.

Pawlowski et al., Unsupervised Lesion Detection in Brain CT using Bayesian Convolutional Autoencoders, $1^{st}$ Conference on Medical Imaging with Deep Learning (MIDL 2018), 2018, pp. 1-3.

Baur et al., "Bayesian Skip-Autoencoders for Unsupervised Hyperintense Anomaly Detection in High Resolution Brain MRI", 2020 IEEE $17^{th}$ International Symposium on Biomedical Imaging (ISBI), Apr. 3-7, 2020, Iowa City, Iowa, USA, pp. 1905-1909.

Zhou et al., "Unsupervised anomaly localization using VAE and beta-VAE", arXiv preprint arXiv:2005.10686, 2020, pp. 1-10.

Hendrycks et al., Deep Anomaly Detection With Outlier Exposure, Proceedings of the International Conference on Learning Representations, 2019, pp. 1-18.

Menze et al., The Multimodal Brain Tumor Image Segmentation Benchmark (BRATS), IEEE Transactions on Medical Imaging, vol. 34, No. 10, Oct. 2015, pp. 1993-2024.

Bakas et al., "Data Descriptor: Advancing The Cancer Genome Atlas glioma MRI collections with expert segmentation labels and radiomic features", Scientific Data, vol. 4, Sep. 2017, pp. 1-13.

Bakas et al., "Identifying the Best Machine Learning Algorithms for Brain Tumor Segmentation, Progression Assessment, and Overall Survival Prediction in the BRATS Challenge", arXiv preprint arXiv:1811.02629, 2018, 49 pages.

Baur et al., "Autoencoders for Unsupervised Anomaly Segmentation in Brain MR Images: A Comparative Study", Journal of Latex Class Files, vol. 14, No. 8, Aug. 2015, pp. 1-16.

Zimmerer et al., "Medical Out-of-Distribution Analysis Challenge", $23^{rd}$ International Conference on Medical Image Computing and Computer Assisted Intervention (MICCAI 2020), Mar. 19, 2020, 37 pages.

Qiao et al., "Weight Standardization", arXiv preprint arXiv:1903.10520, 2019, 10 pages.

Ramachandran et al., "Searching for Activation Functions", arXiv preprint arXiv:1710.05941, 2017, pp. 1-13.

Izmailov et al., "Averaging Weights Leads to Wider Optima and Better Generalization", 34th Conference on Uncertainty in Artificial Intelligence 2018, UAI 2018, 12 pages.

Li et al., "CutPaste: Self-Supervised Learning for Anomaly Detection and Localization", Proceedings of the IEEE/CVF Conference on Computer Vision and Pattern Recognition (CVPR), 2021, 28 pages, https://doi.org/10.48550/arXiv.2104.04015.

Tan et al., "Detecting Outliers with Poisson Image Interpolation", Medical Image Computing and Computer Assisted Intervention—MICCAI 2021, Lecture Notes in Computer Science, Springer, vol. 12905, 2021, pp. 1-12, https://doi.org/10.48550/arXiv.2107.02622.

* cited by examiner

| Method | Average Precision (AUPRC) | Ideal DICE |
|---|---|---|
| (supervised) segmentation w\ 10 labeled patients | 0.757 | 0.701 |
| (unsupervised) Variational Autoencoder | 0.534 | 0.554 |
| (unsupervised) Denoising Autoencoder | 0.802 | 0.738 |
| (unsupervised) Proposed method | 0.792 | 0.734 |

DATA PROCESSING APPARATUS FOR TRAINING A MODEL WITH ABNORMAL MEDICAL IMAGE DATA TO IDENTIFY ABNORMAL MEDICAL IMAGE DATA

FIELD

Embodiments described herein relate generally to a method and apparatus for processing medical/image data, for example for training and using a machine learning model in respect of medical/image data sets.

BACKGROUND

Medical image data, obtained using a variety of imaging modalities can be used for a wide variety of diagnostic, treatment, training or other purposes. It is also known to train machine learning models, for example neural networks, on medical image data, and to use such trained machine learning models for a wide variety of tasks or purposes.

Sets of normal data for use in training models may be more widely available than sets of abnormal data, for example data including pathologies. Hence there is a need for a system that can learn to detect pathologies in as yet unseen images after learning from medical and image data that does not include these pathologies.

SUMMARY

In a first aspect, there is provided an apparatus for training a model to identify abnormal medical/image data, the apparatus comprising processing circuitry configured to: receive medical/image data;
  obtain a local region and a context region from the medical/image data;
  generate abnormal medical/image data using the local region and/or the context region;
  train a model using the medical/image data and the generated abnormal medical/image data to identify abnormal medical/image data.

The local region may comprise a patch region.

Identifying abnormal medical/image data may comprise detecting the presence of abnormal medical/image data and/or determining the presence and/or location of one or more anomalies, for example representing or associated with pathologies, in the medical/image data.

The processing circuitry may be configured to generate a plurality of abnormal medical/image data sets, each abnormal medical/image data set being generated using a respective context region and/or a respective local region, and to train the model using the plurality of normal and abnormal medical/image data sets.

The medical/image data may comprise a plurality of sets of medical/image data and all, or at least a majority, of the sets of medical/image data may represent normal anatomy and/or may not include a pathology and/or may be normal.

The processing circuitry may be configured to generate the abnormal medical/image data by modifying and/or replacing medical/image data for the local region.

The medical/image data may comprise a plurality of sets of medical/image data, and the generating of the abnormal medical/image data may comprise combining a context region of one of the medical/image data sets with a local region of another of the medical/image data sets.

The generating of the abnormal medical/image data or mismatched pairs may comprise modifying medical/image data of the or each local region.

The modifying may comprise applying a spatial transformation or an intensity transformation to medical/image data of the or each local region.

The modifying may comprise at least one of rotating, resizing, blurring, cropping or modifying position co-ordinates. The modifying may comprise supplying the wrong position coordinates to the process.

The modifying and/replacing may comprise taking different medical/image data from a different region of a medical/image data set, or of a further medical/image data set, and using said different medical/image data in the local region.

The generating of abnormal medical/image data may comprise generating abnormal medical/image data from a medical/image data set and using a plurality of different sizes or other scales for the context region and/or the local region to generate a plurality of abnormal medical/image data sets from said medical/image data set.

The abnormal medical/image data may comprise a plurality of abnormal image data sets. At least some of the abnormal image data sets may have context regions and/or local regions of different size or other scale to the context regions and/or local regions of at least some other of the abnormal image data sets.

The context region may at least partially surround the local region. The context region may be contiguous with and/or adjacent to and/or may surround the local region. Alternatively, the context region may be remote or otherwise separated from the local region. Each of the local region and the context region may have any desired shape and/or size.

The context region may be smaller than a region represented by the medical/image data.

The context region may comprise a plurality of context regions.

The or each context region may comprise a region including a specified anatomical or other feature, or other semantic region.

The processing circuitry may be configured to train the model to determine whether a local region matches a surrounding or otherwise associated context region.

The processing circuitry may be configured to provide at least one of atlas co-ordinates or other atlas data, labels, anatomical information, ground truth(s) and/or segmentation information as additional inputs to the training of the model.

The model may comprise at least one convolutional neural network (CNN).

The training of the model may comprise learning and/or extracting features with a limited field CNN or other model wherein the limited field corresponds to the local region.

The training of the model may comprise obtaining a local representation for the context region using a linear or other neural network layer, and optionally performing an averaging and/or pooling process over the context region.

The training of the model may include using a dilated convolution process to obtain representations of local and/or context regions.

The training of the model may include using an attention function or process to obtain representations of local and/or context regions. The attention function may be used to learn a targeted context region, for example instead of aggregating over all remaining images.

The training of the model may include a determination of probability of presence of an abnormality that includes determining a probability of abnormality for each of a plurality of voxels, pixels or other locations, and optionally performing a voting or other joint process using probabilities for neighbouring or other proximate voxels, pixels or other locations.

The training of the model may include concatenating or otherwise combining the local representation of appearance information with at least one of voxel co-ordinates, pixel co-ordinates or other spatial information.

The training of the model may comprise an iterative training process comprising identifying using the model medical/image data sets of the medical/image data that may be abnormal and excluding the identified abnormal medical/image data sets from subsequent training of the model and/or including them with the generated abnormal medical/image data in subsequent training of the model.

The identifying of abnormal image/medical data may comprise identifying image/medical data representing at least one of a tumour, plaque, obstruction, aneurysm, ischaemic region, narrowed blood or other vessel, and/or inflammation.

The medical/image data may comprise 1D, 2D, 3D or 4D data.

The medical/image data may comprise at least one of:
a) CT, MRI, fluoroscopy, ultrasound data or medical imaging data obtaining using other modality;
b) ECG data or other medical measurement data;
c) volumetric data or slice data; and/or
d) time series data.

In a further aspect, which may be provided independently, there is provided an apparatus for identifying abnormal medical/image data comprising processing circuitry configured to:
apply a trained model to a medical/image data set, wherein the trained model is trained to determine whether at least one local region of the medical/image data set matches at least one context region of the medical/image data set; and
determine whether the medical/image data set comprises at least one abnormal region based on the matching of local region(s) and context region(s).

The model may comprise a model trained by an apparatus as claimed or described herein, and/or using a method as claimed or described herein.

The determining or inference process may comprise at least one of:
determining a probability that the medical/image data set comprises at least one abnormal region;
determining a probability that pixel(s), voxel(s) or other data element(s) represent an abnormality.

The determining of whether at least one local region of the medical/image data set matches at least one context region of the medical/image data set matching may comprise determining whether a local region matches a context region for a plurality of different sizes or other scales of context regions and/or local regions.

In a further aspect, which may be provided independently, there is provided a method of training a model to identify abnormal medical/image data, the method comprising:
receiving medical/image data;
obtaining a local region and a context region from the medical/image data;
generating abnormal medical/image data using the local region and/or the context region; and
training a model using the medical/image data and the generated abnormal medical/image data to identify abnormal medical/image data.

In a further aspect, which may be provided independently, there is provided a method of identifying abnormal medical/image data comprising:
applying a trained model to a medical/image data set, wherein the trained model is trained to determine whether at least one local region of the medical/image data set matches at least one context region of the medical/image data set; and
determining whether the medical/image data set comprises at least one abnormal region based on the matching of local region(s) and context region(s).

In a further aspect, which may be provided independently, there is provided an apparatus for training a model which detects an abnormal portion in image data, comprising processing circuitry configured to: receive healthy image which does not include an abnormal portion; divide the healthy image into a local region and a context region; generate an abnormal image based on the local region and the context region; train a model for identifying healthy images and the abnormal images.

The processing circuitry may be further configured to: receive a plurality of the healthy images; and generate the abnormal image based on the local region and the context region, wherein the local region and the context region is based on different original images.

The processing circuitry may be further configured to: transform the local region; and generate the abnormal image based on the transformed local image and the context image.

In a further aspect, which may be provided independently, there is provided a medical image processing apparatus comprising processing circuitry configured to:
receive a population of normal imaging data for training;
learn a local representation for image patches;
learn a context representation for the surrounding image region;
generate local representations which do not match the surrounding context, for instance by selecting a patch from a different image;
learn to classify if the local and context representations are a match or not.

At test time, classification probability may be used as an anomaly detection score.

The local representation may be learned using a CNN. The context representation may be learned using a CNN. The context representation may be learned using the same CNN as the local representation.

The context representation may be aggregated using global average pooling to create a compressed representation. The context representation may be first projected via a learned linear layer before global pooling.

The network may be trained in three dimensions. The network may be provided with atlas coordinates of the or a target voxel as an input.

The context representation may be divided into multiple smaller (e.g. semantic) regions. The context representation may be created using dilated convolutions. An attention layer may be learned for the context region. Negative examples may be generated by applying intensity transformations to the image input to the local representation. Negative examples may be generated by applying spatial transformations to the image input of the local representation such as rotation, blurring, cropping and resizing. Negative examples may be generated by providing false atlas coordinates as input.

An anomaly score may be computed by taking a weighted vote from neighbouring pixels. The system may be trained on unlabelled anomalous data in a two-stage process.

Anomalies detected in the first stage may be excluded from the second stage. The system may be trained on labelled anomalous data and mismatched pairs may correspond to real anomalies.

Features in one aspect or embodiment may be combined with features in any other aspect or embodiment in any appropriate combination. For example, apparatus features may be provided as method features and vice versa.

BRIEF DESCRIPTION OF THE DRAWINGS

Embodiments are now described, by way of non-limiting example, and are illustrated in the following figures, in which.

DETAILED DESCRIPTION

Certain embodiments provide an apparatus for training a model to identify abnormal medical/image data, the apparatus comprising processing circuitry configured to:
receive medical/image data;
obtain a local region and a context region from the medical/image data;
generate abnormal medical/image data using the local region and/or the context region;
train a model using the medical/image data and the generated abnormal medical/image data to identify abnormal medical/image data.

Certain embodiments provide an apparatus for identifying abnormal medical/image data comprising processing circuitry configured to:
apply a trained model to a medical/image data set, wherein the trained model is trained to determine whether at least one local region of the medical/image data set matches at least one context region of the medical/image data set; and
determine whether the medical/image data set comprises at least one abnormal region based on the matching of local region(s) and context region(s).

Certain embodiments provide a method of training a model to identify abnormal medical/image data, the method comprising:
receiving medical/image data;
obtaining a local region and a context region from the medical/image data;
generating abnormal medical/image data using the local region and/or the context region; and
training a model using the medical/image data and the generated abnormal medical/image data to identify abnormal medical/image data.

Certain embodiments provide a method of identifying abnormal medical/image data comprising:
applying a trained model to a medical/image data set, wherein the trained model is trained to determine whether at least one local region of the medical/image data set matches at least one context region of the medical/image data set; and
determining whether the medical/image data set comprises at least one abnormal region based on the matching of local region(s) and context region(s).

Figure 1:
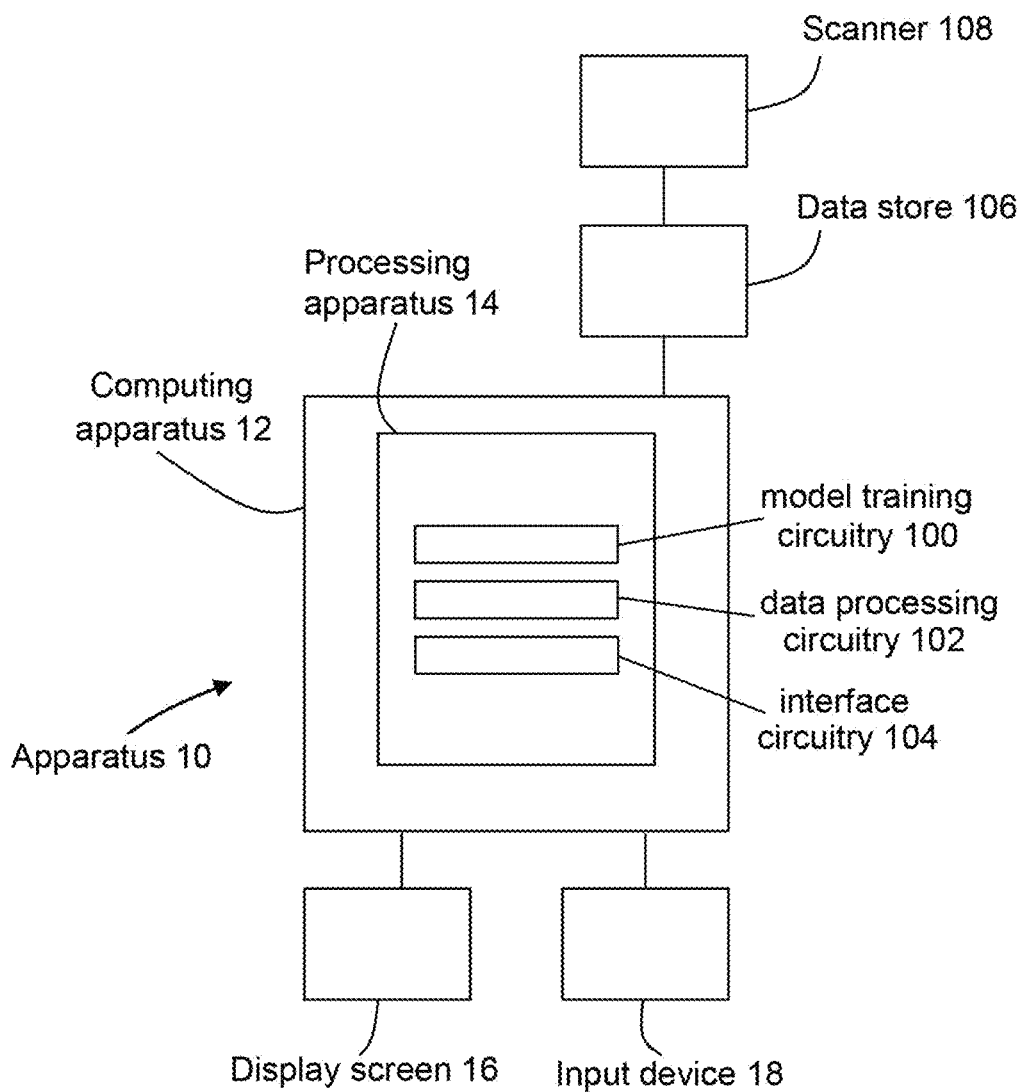
FIG. 1 is a schematic illustration of an apparatus in accordance with an embodiment.

A data processing apparatus 10 according to an embodiment is illustrated schematically in FIG. 1. In the present embodiment, the data processing apparatus 10 is configured to process medical imaging data. In other embodiments, the data processing apparatus 10 may be configured to process any other appropriate data.

The data processing apparatus 10 comprises a computing apparatus 12, which in this case is a personal computer (PC) or workstation. The computing apparatus 12 is connected to a display screen 16 or other display device, and an input device or devices 18, such as a computer keyboard and mouse.

The computing apparatus 12 is configured to obtain image data sets from a data store 106. The image data sets have been generated by processing data acquired by a scanner 108 and stored in the data store 106.

The scanner 108 is configured to generate medical imaging data, which may comprise two-, three- or four-dimensional data in any imaging modality. For example, the scanner 108 may comprise a magnetic resonance (MR or MRI) scanner, CT (computed tomography) scanner, cone-beam CT scanner, X-ray scanner, ultrasound scanner, PET (positron emission tomography) scanner or SPECT (single photon emission computed tomography) scanner. The medical imaging data may comprise or be associated with additional conditioning data, which may for example comprise non-imaging data.

The computing apparatus 12 may receive medical image data or other data from one or more further data stores (not shown) instead of or in addition to data store 106. For example, the computing apparatus 12 may receive medical image data from one or more remote data stores (not shown) which may form part of a Picture Archiving and Communication System (PACS) or other information system.

Computing apparatus 12 provides a processing resource for automatically or semi-automatically processing medical image data. Computing apparatus 12 comprises a processing apparatus 14. The processing apparatus 14 comprises model training circuitry 100 configured to train one or more models; data processing circuitry 102 configured to apply trained model(s) to identify abnormal data or to obtain any other desired processing outcomes, for example for output to a user or for providing to the model training circuitry 100 for further model training processes; and interface circuitry 104 configured to obtain user or other inputs and/or to output results of the data processing.

In the present embodiment, the circuitries 100, 102, 104 are each implemented in computing apparatus 12 by means of a computer program having computer-readable instructions that are executable to perform the method of the embodiment. However, in other embodiments, the various circuitries may be implemented as one or more ASICs (application specific integrated circuits) or FPGAs (field programmable gate arrays).

The computing apparatus 12 also includes a hard drive and other components of a PC including RAM, ROM, a data bus, an operating system including various device drivers, and hardware devices including a graphics card. Such components are not shown in FIG. 1 for clarity.

The data processing apparatus 10 of FIG. 1 is configured to perform methods as illustrated and/or described in the following. It is a feature of the present embodiment that the model training circuitry 100 is able to train a model to detect anomalies, for example arising from possible but rare pathologies, based on training data that represents only healthy subjects and/or that comprises only normal data, or that includes only a small number of pathological or abnormal data sets.

Figure 2:
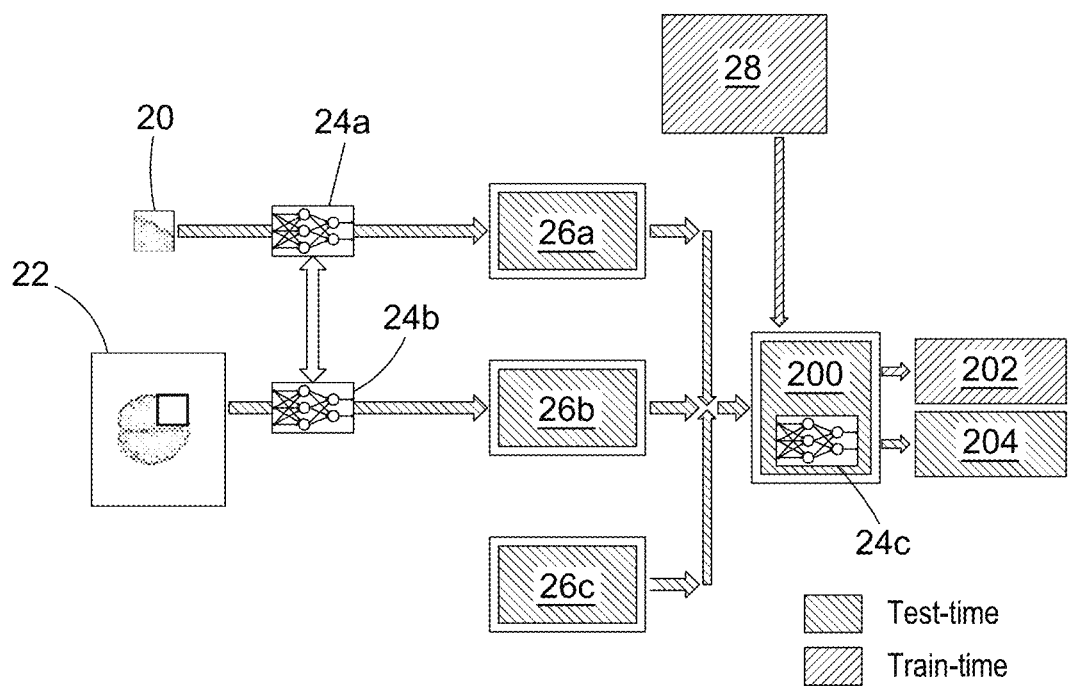
FIG. 2 is a flowchart illustrating the steps of the training and test processes of an embodiment.

FIG. 2 is a flowchart illustrating in overview a training process performed by the model training circuitry 100 of the embodiment of FIG. 1 in one mode of operation. The apparatus of this embodiment is equipped to train a model to identify abnormal image or other data and/or use the model to predict if input image or other data contains anomalies.

The flowchart illustrates the application of the technique to single voxels of medical image data. In other embodiments, a two dimensional slice or other group of data is processed at once. In the current embodiment, the process applied to magnetic resonance imaging (MRI) data of volumetric scans of the human brain. The medical image or other data might all be data that contains no pathologies or are normal, or might include only a small amount of data or a small number of data sets that represent pathologies or are otherwise abnormal.

In some embodiments, atlas coordinates are provided as additional input so that network can learn implicit spatial atlas, and the images may be pre-registered to the atlas.

The training process begins with a separation of local feature information and context information contained in the image data. Local feature information can also be referred to as patch-level information. Context information can also be referred to as image-level information.

For local feature information, a local image 20 or patch is obtained from the medical/image data in respect of the pixel under consideration. The local image or patch may be a region of predetermined size and shape around and/or including the pixel. The local image or patch data is processed using a convolutional neural network (CNN) to learn local features that are local to the pixel under consideration. A shallow CNN 24a, or a CNN with limited receptive field, or resolution, is applied to the local image 20 resulting in local feature information 26a.

For context information, a context image is obtained from the medical/image data and a shallow CNN 24b receptive field is applied to the whole image 22, or other selected context region, excluding the local region. The context information 26b across the context region is aggregated in this embodiment by linearly projecting the local features 26a and averaging over the context region.

Voxel coordinates 26c are concatenated with the context and local information before being input to a match classifier 200.

The training of the model may comprise an iterative training process comprising identifying using the model medical image data sets of the medical image data that may be abnormal and excluding the identified abnormal medical image data sets from subsequent training of the model and/or including them with the generated abnormal medical/image data in subsequent training of the model.

It is a feature of the training process that the match classifier should be provided with at least some abnormal data sets, for example at least some data sets for which the local patch or region does not match its surrounding context region.

In particular, to calculate context and local match probabilities the model can be trained by being presented with matching and mismatched pairs. These mismatched pairs, also referred to as negative pairs, are generated in negative pair generator 28 and represent abnormal data. The abnormal data may be generated by the negative pair generator from training data sets that may be normal before modification by the negative pair generator 28.

Any suitable method may be used by the negative pair generator 28 to generate mismatched pairs or other abnormal data. For example the negative pair generator 28 may use out-of-context information, extract mismatched local features of an augmented figure and/or extract mismatched local features from randomly selected and heavily augmented images. A shuffling method may be used in which out-of-context local representations are selected from elsewhere in an image or between images. An intensity transformations in which unrealistic intensity transformations are applied to local representations. A spatial transformation may be used in which data augmentation such as rotation, resizing, blurring and/or cropping are used to synthesize anomalous local representations.

The abnormal data may be generated using the context region and/or patch region or other local region. The abnormal data sets may be generated, for example, by modifying or replacing the data in the patch region or other local region and/or the context region. In some embodiments, this is achieved by at least one of rotating, resizing, blurring, cropping or by modifying position coordinates of a patch region or other local region, or context region. In some embodiments, this modification is performed by combining the context region of a first medical/image data set with the patch or other local region of a second medical/image data set. In other embodiments, the modifying may comprise taking different medical/image data from a different region of a medical/image data set, or of a further medical/image data set, and using said different medical/image data in the patch or other local region. Abnormal medical/image data generation may also comprise generating abnormal medical/image data from a medical/image data set and using a plurality of different sizes or other scales for the context region and/or the patch or other local region to generate a plurality of abnormal medical/image data sets from said medical/image data set.

In other embodiments, the patch or other local region of a first medical/image data may be used as the patch or other local region for a second medical/image data for the generation of abnormal data sets. In yet other embodiments, abnormal medical/image data may be generated by applying a spatial transformation or intensity transformation to the medical/image data of the or each patch or other local region.

In other embodiments, any suitable other methods may be used to generate mismatched pairs or other abnormal data.

Returning to the process of FIG. 1, the match classifier 200 takes the local feature information 26a, the context information 26b and the mismatched pairs as inputs. In addition, atlas coordinates of the input images are supplied to the match classifier 200. The match classifier 200 outputs the probability of match of context and local information at every pixel. The output probabilities are used as binary classification loss 202 for the training of the model. The training process can be performed on a pixel-by-pixel basis for any suitable number of training data sets, including any desired number of abnormal data sets e.g. data sets with mismatched patch and context regions.

The training process in the embodiment of FIG. 2 produces a trained classifier that, when applied to an input data set can determine, for example on a pixel-by-pixel basis, whether the input data set includes abnormal data based on, for instance, whether the data includes regions that do no match their surrounding regions or other context regions.

The application of the trained model at test-time to an input data set can be performed using the data processing circuitry 102. The data processing circuitry 104 and the model training circuitry 100 are the same circuitry in some embodiments.

For the testing process in this embodiment of the invention, the output of the match classifier 200 comprises output probabilities of mismatch 204 and are used as the anomaly scores to infer the presence or absence of an anomaly. The processing circuitry is configured to train the model to determine whether a patch region matches a surrounding or otherwise associated context region. The identification of abnormal image/medical data may comprise identifying if medical/image data represents at least one of a tumour, plaque, and obstruction, an aneurysm, ischaemic region, narrowed blood or other vessel and/or inflammation.

Figure 3:
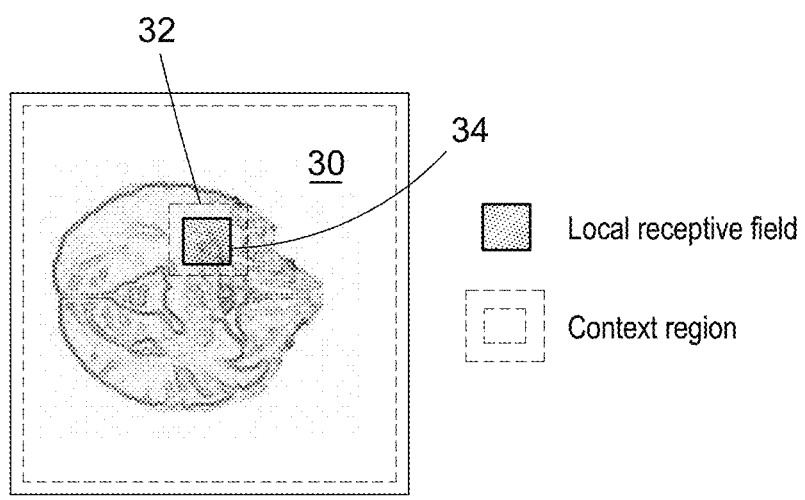
FIG. 3 is an illustration of an MRI image of the human brain with local and context regions superimposed on it.

FIG. 3 shows an MRI image 30 of the human brain. A possible local region and context region are labelled on FIG. 3 to illustrate a relationship between these two regions according to an embodiment. The context region 32 is shown to be larger than the local region 34 and completely surrounding it. In other embodiments, the context region 32 may be the same size as the local region 34 and may be adjacent and/or contiguous to it. In some embodiments, the context region may be remote from or segregated from the local region. While the regions are shown in this embodiment as being rectangular, they can assume any shape in other embodiments.

The context region 32 is generally larger than the local region and at least partially surrounds the local region. The context region 32 can be smaller than the region represented by the medical/image data. The abnormal medical/image data may comprise a plurality of abnormal image data sets and at least some of the abnormal image data sets may have context regions 32 and/or local/patch regions of different size or other scale to the context regions and/or local/patch regions of at least some other of the abnormal image data sets.

The trained model, for example a trained classifier or other network, given two inputs e.g. the representation of the local region 34 and the representation of the context region 32, solves the binary classification task of determining whether the local region and context region match or not.

In the present embodiment, the local representation comprises local features learned and/or extracted from the image data of the local region with a limited receptive field CNN. The context representation comprises appearance information, for example local representation projected using a learned linear neural network layer, then averaged over the context region (using mean pooling), concatenated with spatial information e.g. voxel coordinates (x, y, z). Any other suitable representations of local and context regions may be used in other embodiments as inputs to the classifier.

Embodiments have been described in which patch regions and associated context regions of image data are used. In alternative embodiments, or in variants of the described embodiments, any suitable local regions, for example any suitable sub-set of data, may be used instead of patch regions. In certain embodiments, the medical/image data may comprise 1D, 2D, 3D or 4D data. Multiple forms of medical imaging can be processed, including but not limited to CT, MRI, fluoroscopy, ultrasound or other modality of imaging data. The data may be ECG data or data from any other medical instrument. In other embodiments, the data may be volumetric, a series of two-dimensional slices, or a time series.

Figures 4, 5:
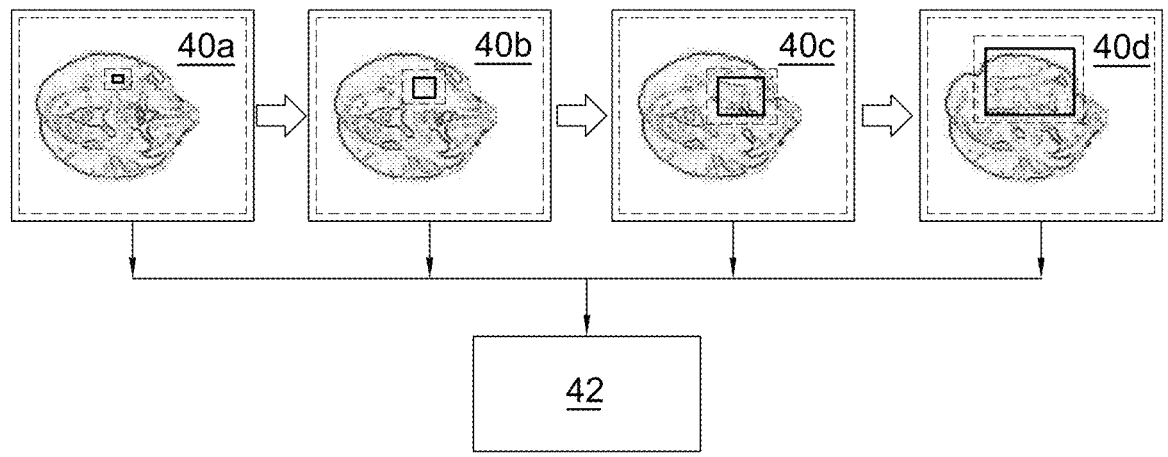
FIG. 4 is a flowchart illustrating a hierarchical configuration used to identify larger and more complex anomalies.
FIG. 5 is a table that presents comparative performance scores for the method according to an embodiment, a segmentation method with labelling, a variational autoencoder and a denoising autoencoder.

FIG. 4 shows a flowchart illustrating the hierarchical configuration of the process used to identify larger and more complex anomalies. Shallow limited receptive field CNNs can be too limited to identify larger and more complex anomalies. Each stage of the process downscales the local information learned by the CNN of the previous stage and applies a new CNN to learn more complex local features from an expanded receptive field with respect to the original resolution. In FIG. 4 this is shown as four successive stages, each referred to as a classification head 40a-40d where the size of the local and patch regions increases with each next iteration. In other embodiments a larger or smaller number of iterations may be used. The context information is aggregated anew using the local information in the current stage. This allows the calculation of classification loss during training as well as pixel anomaly scores during inference at each stage. The results from the stages 40a-40d are upscaled to the original resolution using a weighted mean and combined in 42.

FIG. 5 presents comparative performance scores obtained using a method according to an embodiment, a segmentation method with labelling, a variational autoencoder (VAE) and a denoising autoencoder (DAE). The segmentation method is supervised and the remaining three are unsupervised methods.

The testing was carried out using brain tumour segmentation data from the BraTS 2021 challenge. The four-sequence MRI data comprised native (T1), post-contrast T1-weighted (T1Gd), T2-weighted (T2), and T2 Fluid Attenuated Inversion Recovery (FLAIR) volumes for each patient in a variety of institutions and scanners. Slices of data that do not contain any tumour pixels are used for training. 314 and 48 patients were used for training and validation respectively. The performance of each method was evaluated against the known 'ground truth' of the pathology.

FIGS. 6a-6l are a series of processed MRI data scans of the human brain comparing the performance of four methods of FIG. 5 applied for the detection of anomalies. In each of FIGS. 6a to 6l, four sets of images are shown labelled mod 1, mod 2, mod 3, and mod 4. The image for ground truth is labelled 'GT', the variational autoencoder is labelled 'variational AE', the denoising autoencoder is labelled 'denoising AE' and the claimed method is labelled 'Context/local model'.

Figure 6A:
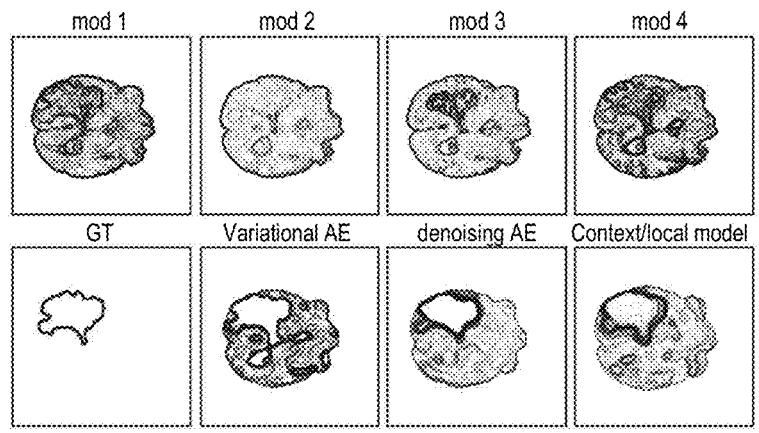
FIGS. 6a-6l are a series of processed MRI data scans of the human brain comparing the performance of three methods applied to the detection of anomalies.

FIG. 6a shows a big, bright and obvious tumour. It was detected by all methods but with variations in segmentation accuracy.

Figure 6B:
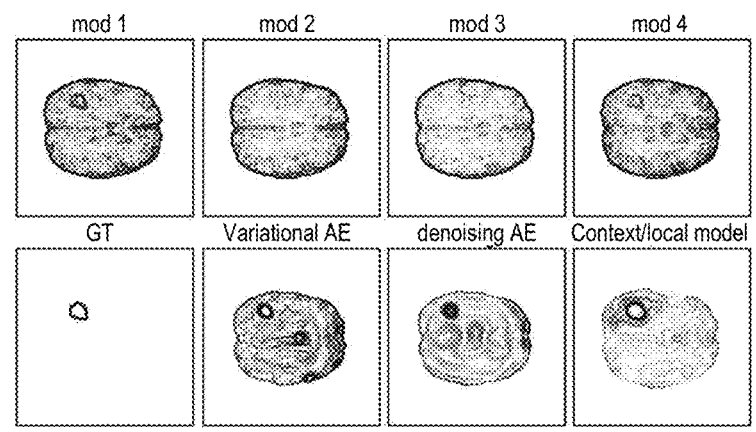

FIG. 6b shows a smaller but still bright tumour of simple shape. It was detected well by all methods.

Figure 6C:
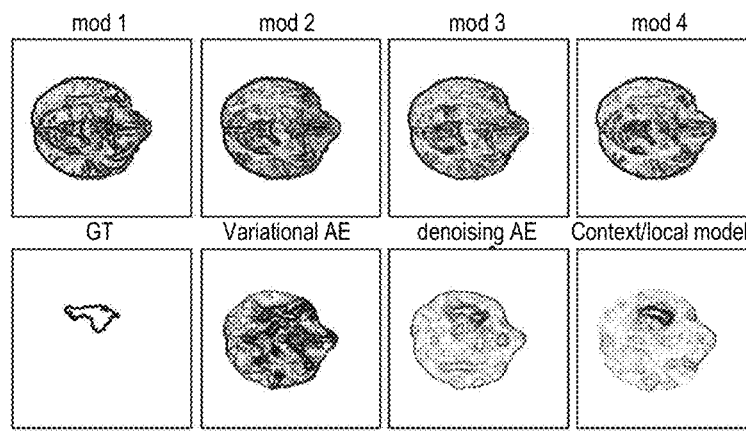

FIG. 6c shows a faint tumour of irregular shape which is difficult to detect. It was detected by the DAE and by the claimed method.

Figure 6D:
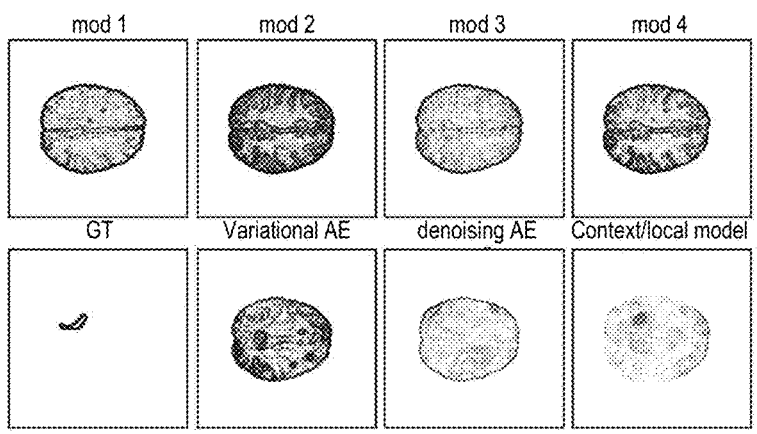

FIG. 6d shows a small and faint tumour that is hard to detect. It was best detected by the method according to the embodiment.

Figure 6E:
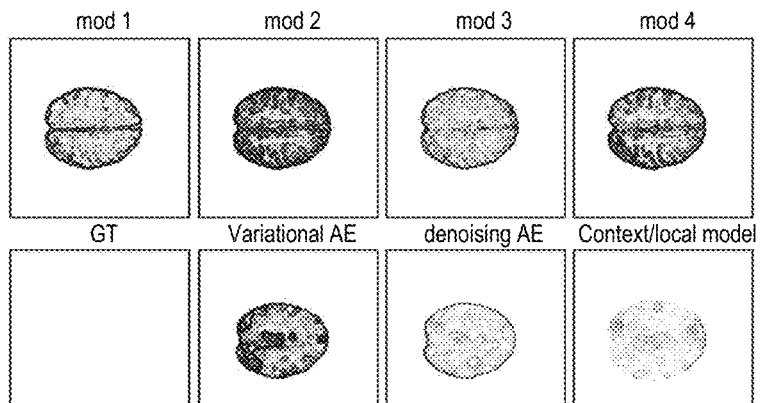
Figure 6F:
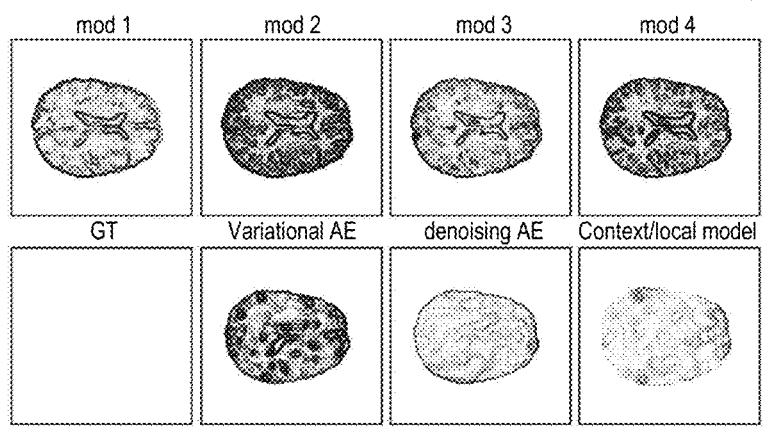
Figure 6G:
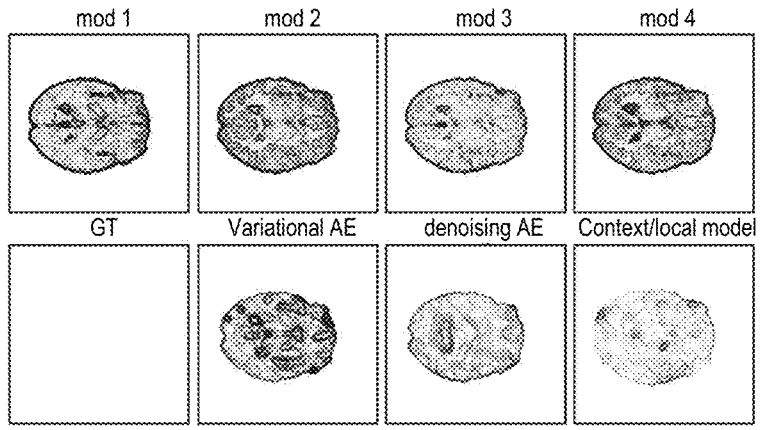

FIGS. 6e, 6f and 6g show scans with no anomalies present in an effort to evaluate performance with respect to false positives. The denoising autoencoder and the method according to the embodiment detected limited false positive while the variational autoencoder detected many false positives.

Figure 6H:
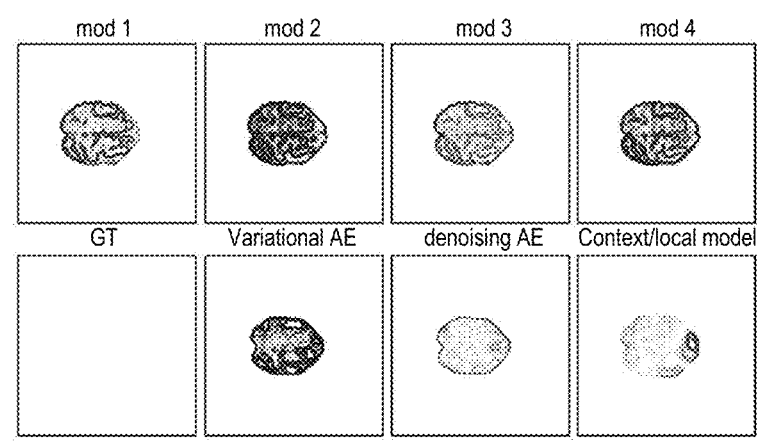

FIG. 6h shows a scan with no anomalies present where the denoising autoencoder does not detect any false positives while both the claimed method and the variational autoencoder detect false positives.

Figure 6I:
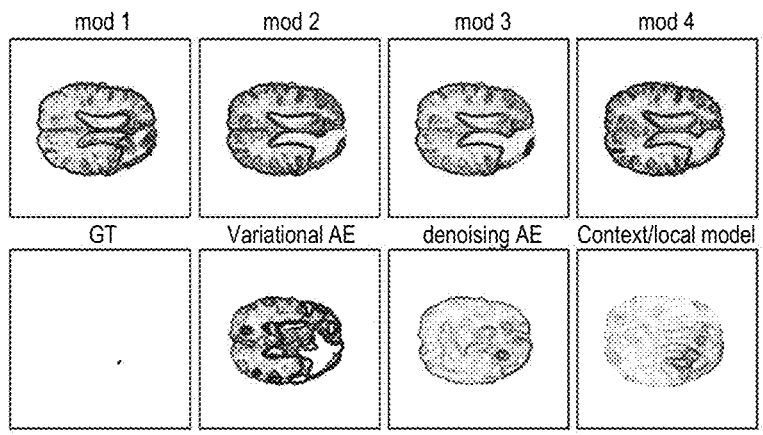

FIG. 6i shows an anomalous lesion rather than a brain tumour. This was detected best by the claimed method.

Figure 6J:
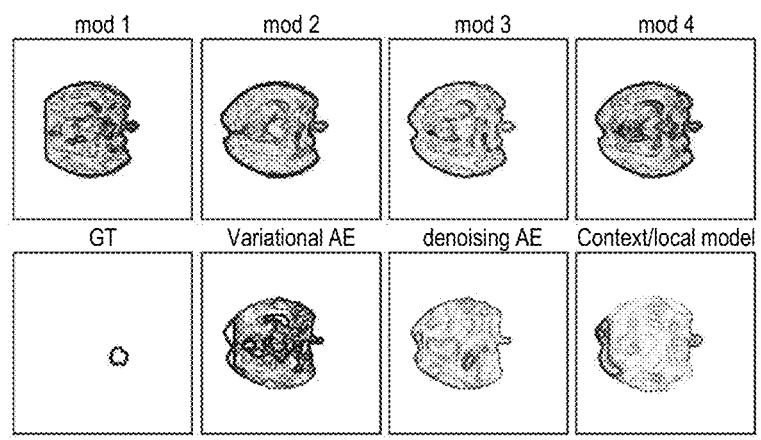

FIG. 6j shows the left side of mod 1 image cut off due to a data processing error. The variational autoencoder and method according to the embodiment detect this as an anomaly, but the denoising autoencoder does not.

Figure 6K:
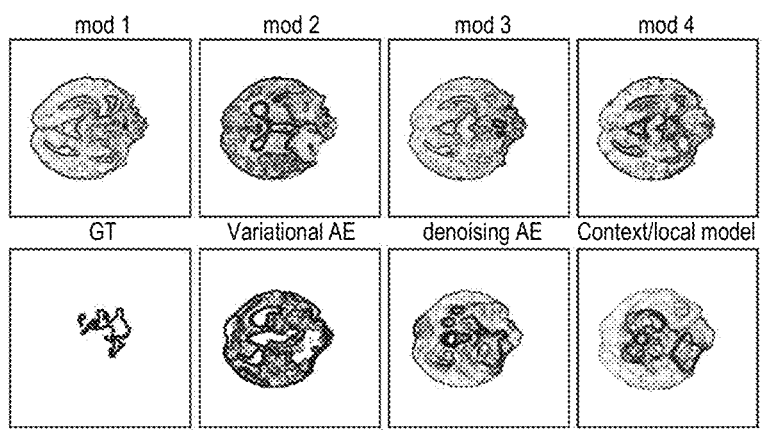

FIG. 6k shows a mod 2 image that has an anomaly and is mismatched, possibly due to registration error.

Figure 6L:
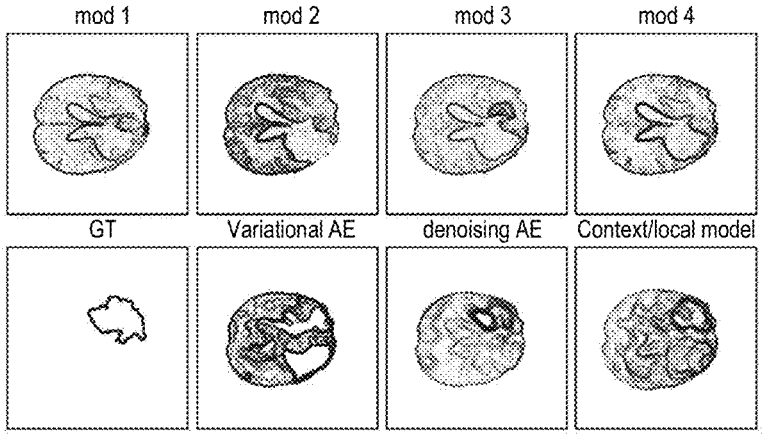

FIG. 6l shows a large tumour and a large anomalous lesion. Both were detected by variational autoencoder and the method according to the embodiment but not by the denoising autoencoder.

Figure 7:
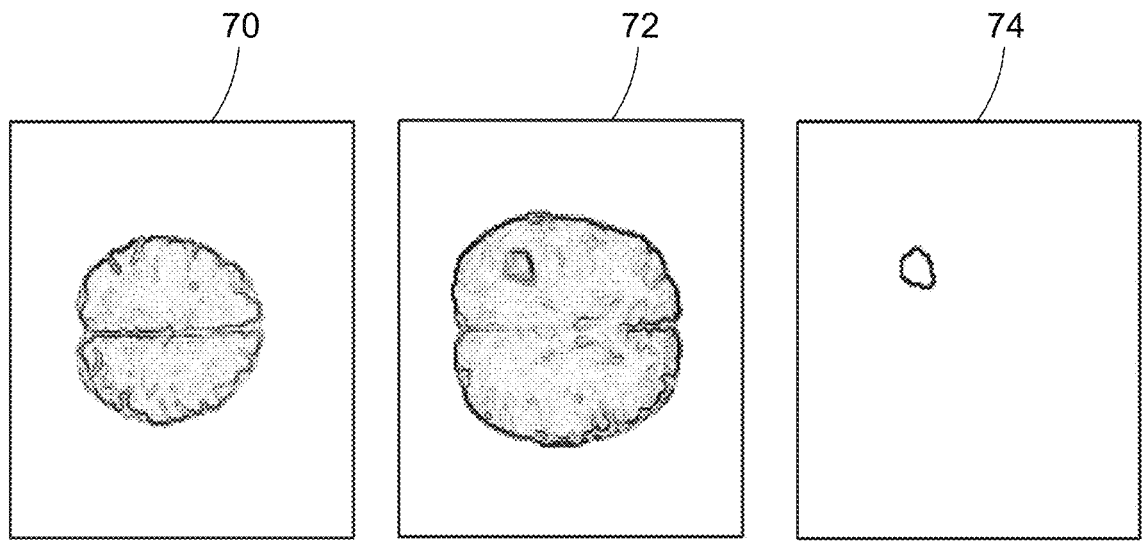
FIG. 7 shows a healthy, an anomalous and a partial scan of MRI data.

FIG. 7 shows a healthy slice of the MRI data 70 of a human brain, an anomalous slice of the MRI data 72 and a slice of MRI data 74 where the image other than that of the tumour has been deleted. The last of these is referred to as the 'ground truth' for inference purposes.

Figure 8:
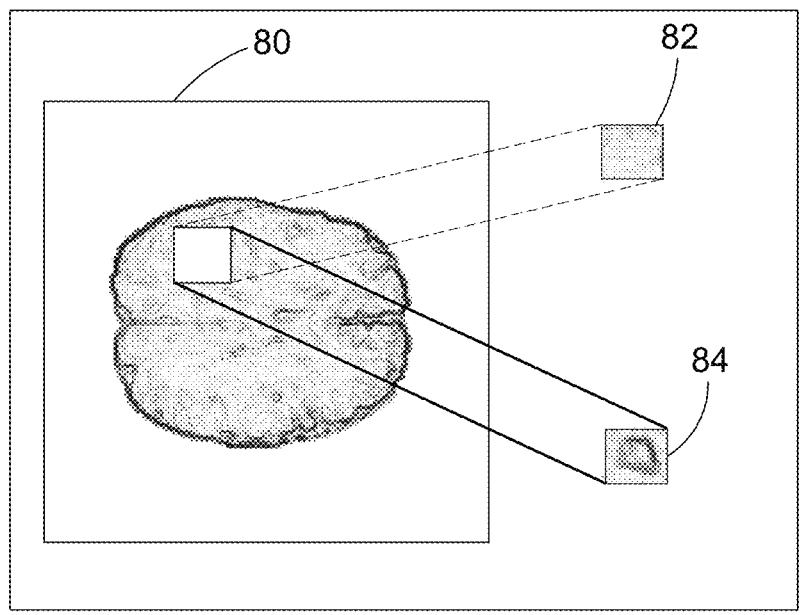
FIG. 8 shows a slice of MRI data of a human brain with a local patch region highlighted.

FIG. 8 shows a slice, or context image, of MRI data 80 of a human brain with a local patch region highlighted. A matching local patch 82 and a mismatched local patch 84 are also illustrated.

Only healthy image data may be available during training of models for unsupervised anomaly detection (UAD) according to some embodiments. UAD in medical imaging according to embodiments may provide for the localizing of anomalies using only healthy data for model training without the need for expensive segmentation annotations of many possible variations of outliers.

In some embodiments, the training of the model may include using an attention function or process to obtain representations of patch and/or context regions. The attention function may, for example, be used to learn a targeted context region.

Whilst embodiments have been described in relation to medical image data, embodiments may be used to process any suitable medical date and/or any suitable image data.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments are described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. An apparatus for training a model to identify particular abnormal medical image data, the apparatus comprising:
    processing circuitry configured to:
        receive medical image data;
        obtain a local region and a context region from the medical image data, wherein the context region at least partially surrounds the local region or is adjacent to or contiguous with the local region;
        generate abnormal medical image data using the local region and/or the context region; and
        train a model using the received medical image data and the generated abnormal medical image data to identify the particular abnormal medical image data,
    wherein the processing circuitry is further configured to generate the abnormal medical image data by modifying and/or replacing the medical image data in the local region, and
    the abnormal medical image data represents at least one of a tumour, plaque, an obstruction, an aneurysm, an ischemic region, a narrowed blood vessel, and inflammation.

2. The apparatus according to claim 1, wherein the processing circuitry is further configured to generate a plurality of abnormal medical image data sets, each abnormal medical image data set being generated using a respective context region and a respective local region, and train the model using the plurality of abnormal medical image data sets.

3. The apparatus according to claim 1, wherein the medical image data comprises a plurality of sets of medical image data, and a majority of the plurality of sets of medical image data represent normal anatomy and/or do not include a pathology and/or are normal.

4. The apparatus according to claim 1, wherein the medical image data comprises a plurality of sets of medical image data, and the generating of the abnormal medical image data comprises combining a context region of one of the plurality of medical image data sets with a local region of another of the plurality of medical image data sets.

5. The apparatus according to claim 1, wherein, in the generating of the abnormal medical image data, the processing circuitry is further configured to modify medical image data of the local region.

6. The apparatus according to claim 5, wherein, in the modifying, the processing circuitry is further configured to apply a spatial transformation or an intensity transformation to the medical image data of the local region.

7. The apparatus according to claim 5, wherein, in the modifying, the processing circuitry is further configured to at least one of rotate, resize, blur, crop, or modify position co-ordinates.

8. The apparatus according to claim 5, wherein, in the modifying and/or the replacing, the processing circuitry is further configured to take different medical image data from a different region of a medical image data set, or of a further medical image data set, and use said different medical image data in the local region.

9. The apparatus according to claim 1, wherein the context region is smaller than a region represented by the medical image data.

10. The apparatus according to claim 1, wherein, in the generating of the abnormal medical image data, the processing circuitry is further configured to generate the comprises-generating abnormal medical image data from a medical image data set, and use a plurality of different sizes or other scales for the context region and/or the local region to generate a plurality of abnormal medical image data sets from said medical image data set.

11. The apparatus according to claim 1, wherein the abnormal medical image data comprises a plurality of abnormal image data sets, and at least some of the abnormal image data sets have context regions and/or local regions of different sizes or other scales to the context regions and/or local regions of at least some other of the abnormal image data sets.

12. The apparatus according to claim 1, wherein the processing circuitry is further configured to train the model to determine whether the local region matches the context region, which surrounds or is otherwise associated with the local region.

13. The apparatus according to claim 1, wherein the training of the model further comprises an iterative training process comprising:
    identifying, using the model, medical image data sets of the medical image data that may be abnormal, and
    excluding the identified abnormal medical image data sets from subsequent training of the model and/or including the identified abnormal medical image data sets with the generated abnormal medical image data in subsequent training of the model.

14. The apparatus according to claim 1, wherein the medical image data comprises 1D, 2D, 3D, or 4D data.

15. The apparatus according to claim 1, wherein the medical image data comprises at least one of:
    CT, MRI, fluoroscopy, ultrasound data, or medical imaging data obtaining using other modality;
    ECG data or medical measurement data;
    volumetric data or slice data; or
    time series data.

16. An apparatus for identifying particular abnormal medical image data, the apparatus comprising:
    processing circuitry configured to:
        apply a trained model to medical image data set, wherein the trained model was previously trained to determine whether at least one a local region of the medical image data set matches at least one a context region of the medical image data set, wherein the context region at least partially surrounds the local region or is adjacent to or contiguous with the local region; and
        determine whether the medical image data set comprises the particular abnormal region based on the matching of the local region and the context region,
    wherein the processing circuitry is further configured to generate, as training data for training the model, abnormal medical image data by modifying and/or replacing the medical image data in the local region, and
    the abnormal medical image data represents at least one of a tumor, plaque, an obstruction, an aneurysm an ischaemic region, a narrowed blood vessel, and inflammation.

17. A method of training a model to identify particular abnormal medical image data, the method comprising:
    receiving medical image data;
    obtaining a local region and a context region from the medical image data, wherein the context region at least partially surrounds the local region or is adjacent to or contiguous with the local region;
    generating abnormal medical image data using the local region and/or the context region; and
    training a model using the received medical image data and the generated abnormal medical image data to identify the particular abnormal medical image data,
    wherein the generating step further comprises generating the abnormal medical image data by modifying and/or replacing the medical image data in the local region, and
    the abnormal medical image data represents at least one of a tumor, plaque, an obstruction, an aneurysm, an ischaemic region, a narrowed blood vessel, and inflammation.

18. A method of identifying particular abnormal medical image data, the method comprising:
    applying a trained model to a medical image data set, wherein the trained model was previously trained to determine whether a local region of the medical image data set matches a context region of the medical image data set, wherein the context region at least partially surrounds the local region or is adjacent to or contiguous with the local region; and
    determining whether the medical image data set comprises the particular abnormal medical image data based on the matching of the local region and the context region,
    wherein the method further comprises generating as training data for training the model, abnormal medical image data by modifying and/or replacing the medical image data in the local region, and
    the abnormal medical image data represents at least one of a tumor, plaque, an obstruction, an aneurysm, an ischaemic region, a narrowed blood vessel, and inflammation.

* * * * *